United States Patent [19]

Iizuka

[11] 4,188,933
[45] Feb. 19, 1980

[54] APPARATUS FOR CONTROLLING OPERATION OF INLET AND EXHAUST VALVES AND SUPPLY OF FUEL TO SELECTED CYLINDERS OF ALL OF MULTI-CYLINDER I. C. ENGINE

[75] Inventor: Haruhiko Iizuka, Yokosuka, Japan

[73] Assignee: Nissan Motor Company, Limited, Yokohama, Japan

[21] Appl. No.: 937,997

[22] Filed: Aug. 30, 1978

[30] Foreign Application Priority Data

Oct. 26, 1977 [JP] Japan .............................. 52/143660

[51] Int. Cl.$^2$ ............................................. F02D 13/06
[52] U.S. Cl. ................................ 123/198 F; 123/97 B
[58] Field of Search ........... 123/198 F, 32 EA, 32 EI, 123/97 B

[56] References Cited

U.S. PATENT DOCUMENTS

| | | | |
|---|---|---|---|
| 2,875,742 | 3/1959 | Dolza ................................ | 123/198 F |
| 2,918,047 | 12/1959 | Mick ................................. | 123/198 F |
| 2,919,686 | 1/1960 | Mick ................................. | 123/198 F |
| 2,947,298 | 8/1960 | Dolza ................................ | 123/198 F |
| 3,958,900 | 5/1976 | Veno ................................. | 123/198 F |
| 4,050,435 | 9/1977 | Fuller, Jr. et al. ............... | 123/198 F |
| 4,064,844 | 12/1977 | Mutsumoto et al. ............. | 123/198 F |
| 4,080,941 | 3/1978 | Iizuka ............................... | 123/198 F |

Primary Examiner—Ira S. Lazarus

[57] ABSTRACT

An apparatus for controlling the operation of inlet and exhaust valves and the supply of fuel to selected cylinders of all of a multi-cylinder internal combustion engine. The inlet and exhaust valves for induction and exhaust of the selected cylinders of all are closed and the supply of fuel to them is cut off to operate the engine on the remaining cylinders of all. According to the invention, a detector to detect a predetermined control event in which the engine is to be decelerated is provided. Also provided is a valve operation restoring device for causing restoration of the disabled valves when said detector detects the predetermined control event to let the disabled cylinders to pump air to achieve effective engine braking.

1 Claim, 3 Drawing Figures

APPARATUS FOR CONTROLLING OPERATION OF INLET AND EXHAUST VALVES AND SUPPLY OF FUEL TO SELECTED CYLINDERS OF ALL OF MULTI-CYLINDER I. C. ENGINE

BACKGROUND OF THE INVENTION

The present invention relates to an apparatus for controlling the supply of fuel to selected cylinders of all of and the operation of inlet and exhaust valves of the selected cylinders of a multi-cylinder internal combustion engine.

A known apparatus for controlling the supply of fuel to selected cylinders of all of and the operation of inlet and exhaust valves of the selected cylinders of a multi-cylinder internal combustion engine comprises electrically energizable fuel injectors for all cylinders of the engine, respectively, and adapted when energized to discharge fuel adjacent the inlet valves, respectively, for induction into all of the cylinders. An engine load detection device is provided to detect a predetermined control element in which the engine is to run on selected cylinders of all and a control circuit is provided to disable the fuel injectors of the remaining cylinders. The apparatus also comprises an valve operating device effective to disable the operation of the inlet and exhaust valves for the remaining cylinders to maintain them in their closed position as long as the engine load detection device detects the predetermined control event.

A problem encountered in this known control apparatus is that, when the engine is to be decelerated while the engine runs on the selected cylinders of all, the effective engine braking can not be obtained since the disabled cylinders do not pump air.

SUMMARY OF THE INVENTION

It is therefore an object of the present invention to improve the apparatus as mentioned above by eliminating the problem encounted with it.

According to the present invention, there are provided detector to detect a predetermined control event in which the engine is to be decelerated and means for restoring the normal operation of the disabled inlet and exhaust valves to let the disabled cylinders to pump air when the detector detects the predetermined control event while the engine is running on the selected cylinders of all.

DESCRIPTION OF THE PREFERRED EMBODIMENT

In this preferred embodiment, an electronic fuel injection control system for a 6-cylinder internal combustion engine is employed, which supplies fuel to selected three cylinders of all through three fuel injection nozzles, respectively, when the engine operates at three-cylinder mode. Supply of fuel to the other three cylinders is cut and a pair of inlet and exhaust valves associated with each of these cylinders are maintained fully closed when the engine run on three cylinders.

Figure 1:
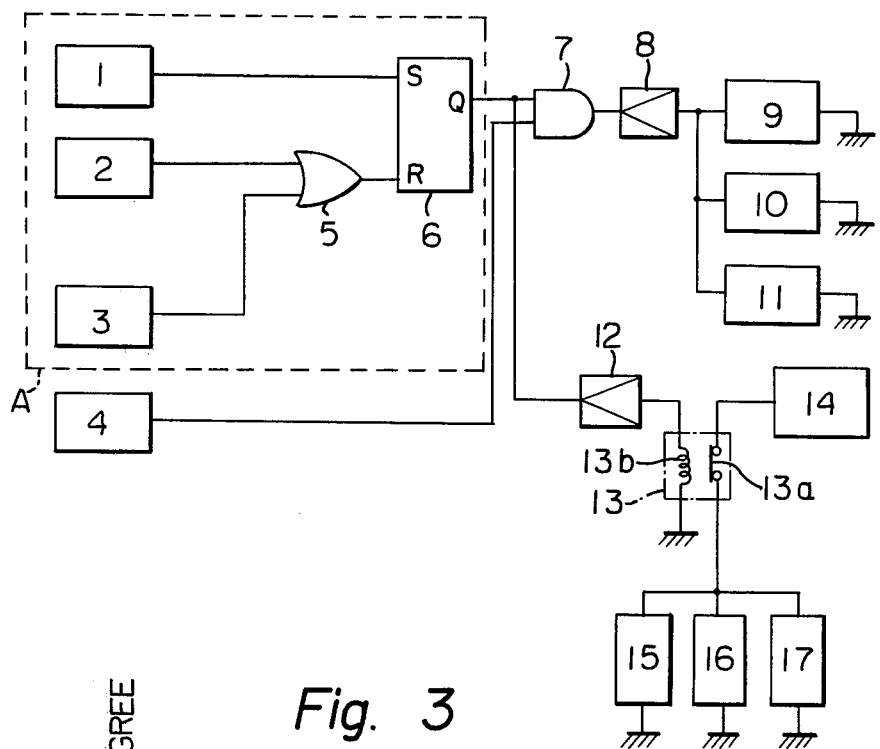
FIG. 1 is a diagram of an apparatus for controlling the supply of fuel to cylinders of and the operation of inlet and exhaust valves of a multi-cylinder internal combustion engine.

In FIG. 1, a first throttle switch 1, which is designed to detect a light load, is operatively connected with a throttle blade or valve to produce a high level signal "1" when the throttle opening degree is smaller than a predetermined relatively small opening degree $\theta_1$.

A second throttle switch 2, which is designed to detect a high or heavy load, is operatively connected with the throttle valve also to produce a high level signal "1" when the throttle opening degree is greater than a predetermined relatively great opening degree $\theta_2$.

An engine speed switch 3, which is designed to detect a low engine speed range, produces a high level signal "1" when the engine speed is lower than a predetermined low speed $N_O$.

When it is desired to effect engine braking operation during 3-mode engine operation under light load so as to rapidly decelerate the vehicle, the operation of the inlet and exhaust valves associated with the deactivated cylinders will be restored. For this purpose, a detector or switch 4 is provided which detects a condition where the engine braking is demanded, such as operating condition of a foot brake pedal, or return speed of an accelerator pedal (whether the return speed exceeds a predetermined level or not). The detector 4 switces its output from a high level signal "1" to a low level signal "0" upon detection of such a condition and produces the low level signal "0" while it detects such the condition.

The reference numeral 5 is an OR circuit which produces a high level signal "1" when at least one of its inputs from the switches 2 and 3, respectively, switches from a low level signal "0" to a high level signal "1".

The reference numeral 6 is a flip-flop circuit which has its set input terminal (S) connected to the switch 1 to receive the output therefrom and its reset input terminal (R) connected to the OR circuit 5 to receive the output therefrom. As is well known, the flip flop 6 switches an output on its Q output terminal from a low level signal "0" to a high level signal "1" when the set input switches to a high level signal "1", and return to the low level signal "0" when the reset input switches to a high level signal "1".

As will now be understood, the throttle switches 1 and 2, the speed switch 3, the OR circuit 5 and the flip flop circuit 6 constitute a load detection device A which detects an engine operating condition under light load.

An AND circuit 7 produces an output when the outputs of the flip flop 6 and the detector 4 are at high level signals "1", the output from the AND circuit 7 being amplified at an amplifier 8 before supplied to solenoid actuated switching valves 9, 10 and 11 to operate them.

These solenoid valves 9, 10 and 11 are associated with three pairs of inlet and exhaust valves for three cylinders, respectively to disable the inlet and exhaust valves to maintain them in fully closed condition when the output from the AND circuit 7 is at a high level signal "1".

The Q output from the flip flop circuit 6 is supplied through an amplifier 12 to a relay 13 to energize a relay coil 13b thereof when a high level signal "1" appears as Q output. The relay 13 has a normally closed switching contact 13a which forms part of a signal transmitting line from an output of a fuel injection control unit 14 to three fuel injection valves 15, 16 and 17 for the three cylinders associated with solenoid valves 9, 10 and 11. When opened by energization of the relay coil 13b, the contacts 13a stop fuel injection via these fuel injection valves.

Figure 2:
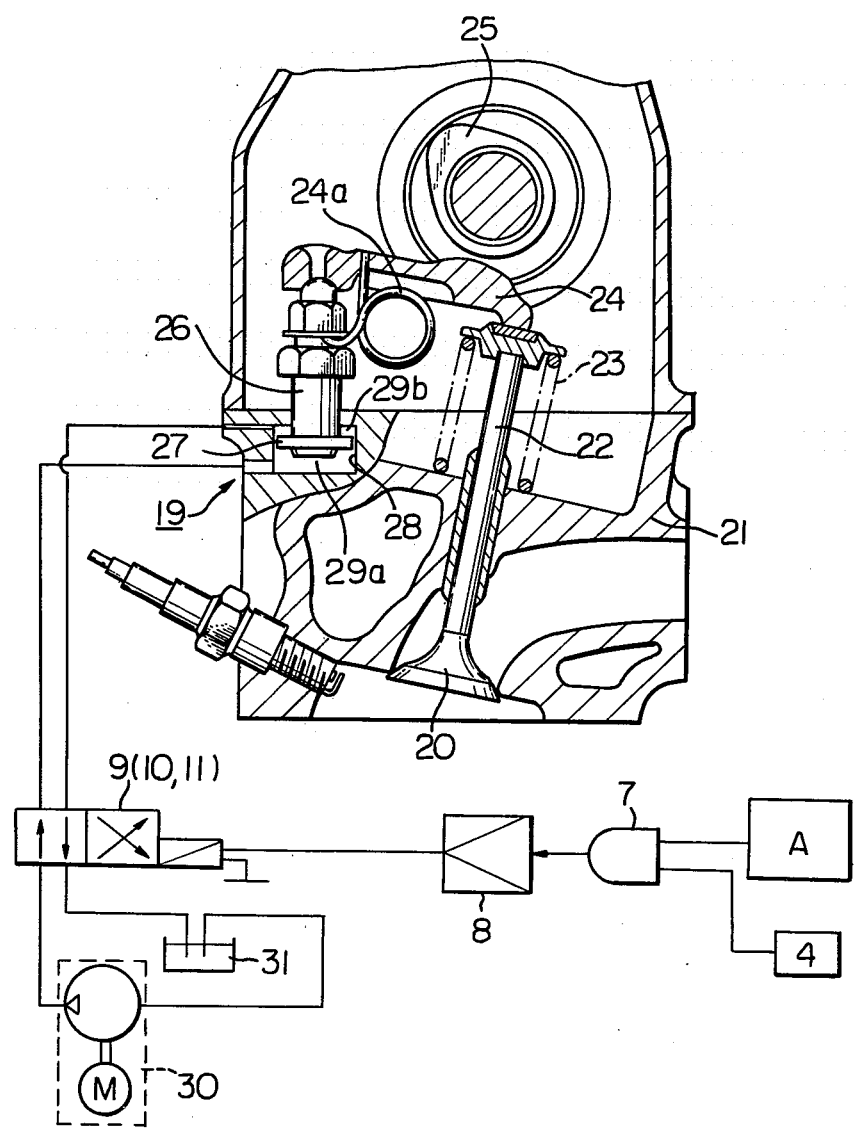
FIG. 2 is a diagram explaining the operation modes of the apparatus.

FIG. 2 shows an apparatus 19 to deactivate an inlet valve and an exhaust valve 20. In this Figure, the reference numeral 21 designates a cylinder head, the reference numeral 22 a valve shaft, the reference numeral 23 a valve spring, the reference numeral 24 a rocker arm rockable under the control of a cam 25 against the bias of the valve spring 24 to open the valve, and the reference numeral 26 a rocker pivot on which the rocker arm 24 is mounted, by means of a spring clamp 24a, for rockable movement about a rounded top of the rocker pivot 26, (see FIG. 2).

The rocker pivot 26 has at its lower portion a piston section 27 integrally formed therewith. The piston section 27 is slidably disposed in a cylinder 28 to divide the cylinder into a lower and upper pressure chambers 29a and 29b, the lower side and the upper side of the piston section 27 communicating with or being exposed to the lower and upper pressure chambers 29a and 29b, respectively. By selectively applying pressure to the pressure chambers 29a and 29b the rocker pivot 26 will move upwardly or downwardly, viewing in FIG. 2.

Explaining more specifically, under the control of a switching valve 9, the pressure is applied to the pressure chambers 29a and 29b alternatively. There are provided three such switching valves and their associated control circuit for the rocker pivots corresponding to three cylinders, respectively. As previously described the outputs of the load detection device A of the deceleration detector 4 are fed to the inputs of the AND circuit 7. The output of the AND circuit 7 is fed to each of the solenoid valve 9 via an amplifier 8 to actuate the same. Under the illustrated condition in FIG. 2, the pressure from the source of pressure 30 is supplied or applied to the lower pressure chamber 29a to maintain the rocker pivot 26 in the illustrated elevated position in which the appropriate operation of the pair of inlet and exhaust valves, such as shown at 20, is possible, that is, rotation of the cam 25 will cause the rocker arm 24 to rock to open and close the valve 20.

When the output of the AND circuit 7 is at a logical 1, the switching valve 9 switches its condition to cut off fluid communication between the lower pressure chamber 29a and the source of pressure 30 and establishes fluid communication between the upper chamber 29b and the source of pressure 30, thus lowering the rocker pivot 26 toward an inoperable position in which the rocker arm 24 is out of contact with the cam 25 so that rotating the cam 25 will not cause the rocker arm 24 to tap the valve 20. As a result, the bias of the valve spring 23 the valve is maintained in its fully closed position.

In the construction previously described, under light load engine operating condition in which the throttle opening degree is smaller than $\theta_1$ the output of the switch 1 switches to a high level signal "1" to cause the flip flop circuit 6 to produce a high level signal "1" as its Q output, then the relay 13 is energized to open the normally closed contacts 13a to stop operation of the fuel injection valves 15, 16 and 17. Under this condition, unless the brake is actuated the output of the detector 4 is at a high level signal "1" so that the AND circuit 7 produces a high level signal "1" as its output to cause the solenoid operated switch valves 9, 10 and 11 to change their state from the illustrated condition in FIG. 2 to maintain the inlet and exhaust valves of the deactivated three cylinders in fully closed condition.

Under relatively high or heavy load engine operating condition in which the throttle opening degree is larger than $\theta_2$ or under engine operating condition at low engine speed in which the engine revolution speed is lower than $N_O$, the output of the OR circuit becomes a high level signal "1" so as to reset the flip-flop circuit 6 to cause it to produce a low level signal "0" as its Q output. Under this condition, since the energization of the relay 13 ceases to permit the contacts 13a to be closed again so that the operation of the fuel injection valves 15, 16 and 17 resume and since the output of the AND circuit 7 becomes a low level signal "0", the solenoid operated switching valves 9, 10 and 11 return to the illustrated condition in FIG. 2. Thus, the inlet and exhaust valves 20 of the three cylinders operate appropriately and the engine operates at 6-cylinder mode.

When the brake is actuated or stepped on while the Q output of the flip flop circuit 6 is at a high level signal "1", that is, when the engine operates under light load and at 3-cylinder mode operation, the output of the detector 4 becomes a low level signal "0" so as to cause the AND circuit 7 to produce a low level signal "0" as its output so that owing to the switching valves 9, 10 and 11 the operation of the inlet and exhaust valves 20 for the deactivated cylinders resumes. Since, then, the Q output of the flip flop circuit 6 remains at a high level signal "1", the solenoid 13 is maintained in energized condition so that the fuel supply through the fuel injectors to the deactivated cylinders will not resume. Thus, the deactivated cylinders to which fuel supply is cut perform pumping action by operating their inlet and exhaust valves to increase engine braking effect to meet rapid deceleration requirement.

Under mild decelerating engine operating condition with the brake being not actuated, that is, for example during coasting (running of the vehicle by its inertia) from high speed running condition, the output of the AND circuit 7 remains at high level signal "1" so that the inlet and exhaust valves for the deactivated cylinders will not resume their operation under this condition. Thus, the engine braking effect resulting from the three activated cylinders is provided which meets the practical requirements under this operating condition.

It will be recognized that actuating or stepping on the brake will always cause all of the inlet and exhaust valves for all cylinders to operate appropriately because the output of the AND circuit 7 becomes a low level signal "0" when the brake is actuated regardless of the outputs of the switches 1, 2 and 3.

The operation when the throttle opening degree is between $\theta_1$ and $\theta_2$ will be described hereinafter. When the engine operating condition enters this region while increasing the amount of load imposed on the engine, 6-cylinder mode engine operation will be maintained because the Q output of the flip flop 6 remains at a low level signal "0" until the throttle switch 1 supplies a high level signal "1" to the set terminal of the flip flop circuit 6. When the engine operating condition enters this region which decreasing the amount of load imposed on the engine, 3-cylinder mode engine operation will be maintained until throttle switches switch 2 supplies a high level signal "1" to the reset terminal of the flip flop circuit 6. Even under these conditions, all of the inlet and exhaust valves for all of the cylinders will operate when the brake is actuated.

Figure 3:
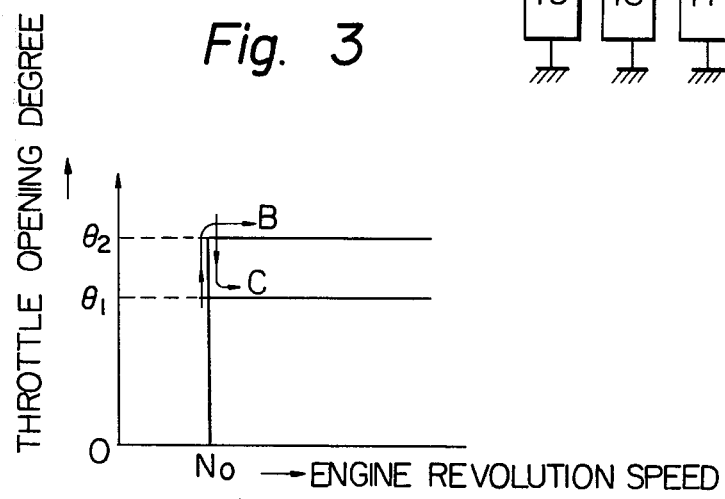
FIG. 3 is a schematic view of the section of the apparatus which controls the operation of inlet and exhaust valves.

The above described operating conditions are visualized as a pattern B or C as shown in FIG. 3.

Although the detector 4 used in the embodiment is responsive to the actuation of the brake to detect the engine braking requirement, such requirement may be detected by the return rate or speed of an accelerator pedal. Thus a detector which detects such speed rate may be alternatively used as the detector 4.

In a fuel injection control process in which width of the fuel injection pulse is determined proportional to the total of the intake air supplied to the engine, with the same load switching from the 6-cylinder mode engine operating condition to 3-cylinder mode engine operating condition may result in a loss of the engine power output or misfire, because such switching will not alter the quantity of fuel injected to activated cylinders even if the quantity of air to be supplied to the deactivated cylinders will be distributed to the activated cylinders evenly.

This problem may be solved by increasing or doubling the injection pulse width in response to this switching Although the invention has been described in connection with 6-cylinder engine, the invention may be equally applied to other multi cylinder engine such as 4-cylinder or 8-cylinder engine.

Each of the switches 1, 2, 3 and 4 may be replaced with a unit including a device detecting an analog amount and a comparator which produces a high or low level signal as an output when the measure analog amount exceeds or is below a predetermined value.

The determination of light load engine operation may be made by detecting the width of the fuel injection pulse or detecting the magnitude of the intake depression or vacuum.

The invention may be applied to an engine with carburetor induction. In this case during deceleration the engine may be controlled to operate on 6-cylinder mode during deceleration.

What is claimed is:

1. In combination, a multi-cylinder internal combustion engine including a plurality of cylinders, each being provided with an inlet valve and an exhaust valve, the plurality of cylinders consisting of a first group of cylinders and a second group of cylinders;

electrically energizable fuel injectors for said plurality of cylinders, respectively, and adapted when energized to discharge fuel adjacent said inlet valves, respectively, for induction into said plurality of cylinders;

an engine load detection means for detecting a first predetermined control event in which said engine is to run on said first group of cylinders;

means for disabling the fuel injectors adapted to discharge fuel adjacent the inlet valves, respectively, as long as said engine load detection means detects said first predetermined control event;

means for detecting a second predetermined control event in which said engine is to be decelerated;

first valve operating means for causing said inlet and exhaust valves to perform induction and exhaust of said first group of cylinders;

second valve operating means for causing said inlet and exhaust valves to perform induction and exhaust of said second group of cylinders;

valve disabling means for disabling said second valve operating means so that said inlet and exhaust valves for said second group of cylinders are maintained in their closed positions; and valve operation restoring means for causing said valve disabling means to restore normal operation of said inlet and exhaust valves for induction and exhaust of said second group of cylinders to allow said second group of cylinders to pump air when said detecting means detects said second control event while said engine load detection means detects said first predetermined control event.

* * * * *